No. 728,081. PATENTED MAY 12, 1903.
B. A. BUCHANAN.
GRAVE COVERING.
APPLICATION FILED JUNE 6, 1901.
NO MODEL.
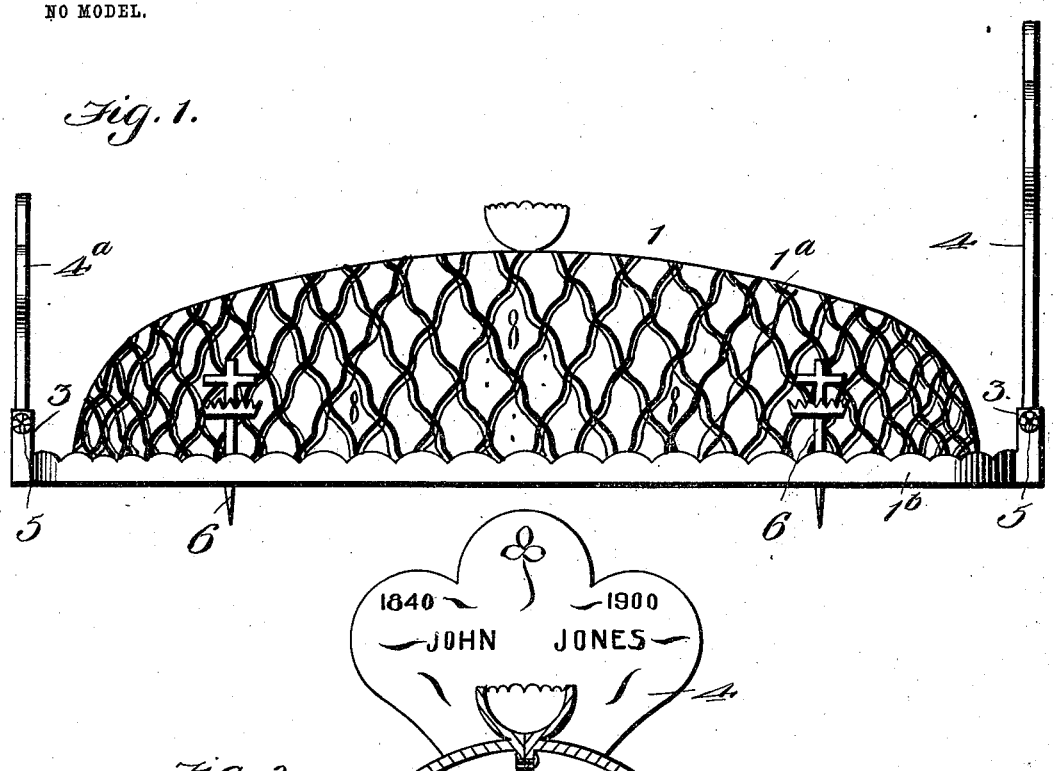
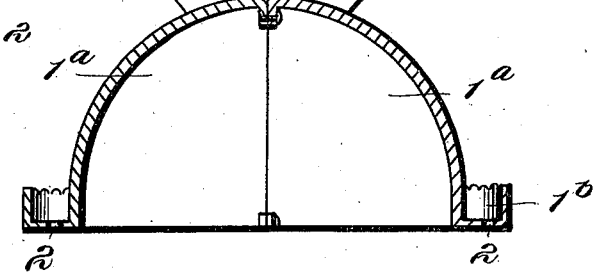
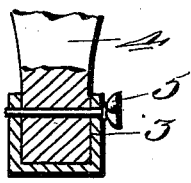
Witnesses
Inventor:
Bettie A. Buchanan
by Edson Bro's
Attorneys No. 728,081. Patented May 12, 1903.

UNITED STATES PATENT OFFICE.

BETTIE ASHLEY BUCHANAN, OF LAPEL, INDIANA.

GRAVE-COVERING.

SPECIFICATION forming part of Letters Patent No. 728,081, dated May 12, 1903.

Application filed June 6, 1901. Serial No. 63,415. (No model.)

*To all whom it may concern:*

Be it known that I, BETTIE ASHLEY BUCHANAN, a citizen of the United States, residing at Lapel, in the county of Madison and State of Indiana, have invented certain new and useful Improvements in Grave-Coverings; and I do hereby declare the following to be a full, clear, and exact description of the invention, such as will enable others skilled in the art to which it appertains to make and use the same.

My invention relates to improvements in copings or coverings for graves. It has for its object more especially to protect the grave, to keep it always sightly as well as ornamental and retain the mound shape, and provide for the ready attachment or erection of a head and foot piece or means of identification of the grave.

It consists of the combination and construction of parts, substantially as hereinafter more fully disclosed, and specifically pointed out by the claims.

In the accompanying drawings, illustrating the preferred embodiment of my invention, Figure 1 is a side view. Fig. 2 is a cross-section. Fig. 3 is a detailed sectional view disclosing more particularly the head-piece socket connection, a duplicate foot-piece socket connection being also provided at the opposite end of the covering or coping.

Latitude is allowed herein as to details, as they may be changed or varied at will without departing from the spirit of my invention and the same yet remain intact and be protected.

In carrying out my invention I construct for the application or placing over a grave or the mound thereof a covering or coping 1, preferably of cast metal or any other suitable material. The covering or coping 1 is preferably rounding laterally and longitudinally, conformable to the contour of the usual mound erected over graves, and may be in a single piece or, as shown herein, in two sections or parts $1^a$, with the meeting surfaces therebetween in the longitudinal plane and suitably held together upon the under side, as shown. Said coping or covering has cast or made with it around its base a shallow receptacle or trough $1^b$ to receive or contain plants or flowers, as may be desired. Said receptacle or trough completely encompasses said coping, being of course formed as the coping or covering sections, also in sections joined or united at the ends, as shown, producing a continuous chamber or receptacle. The trough or receptacle $1^b$ has through its bottom openings or passages 2, as in the usual flower pots or vases, for the purpose well understood.

The coping or covering, which may be produced with any suitable or fanciful configuration, as shown, is designed to be coated with enamel, preferably in white, or otherwise weatherproofed, with its configurated surface gilded, bronzed, or otherwise further ornamented according to taste of owner.

The coping or covering may have cast or otherwise produced in its surface in alto-rilievo or intaglio the name of the order or profession or some family or household name of the interred, as will be readily appreciated. Also upon the coping or covering may be suitably superposed and secured, or not, vases, urns, &c., for also holding flowers or plants.

At the ends of the coping or covering are sockets 3 3, which receive the shanks or lower portions of head and foot pieces 4 $4^a$, respectively, the purpose of which is well understood. Ornamental headed bolts 5 $5^a$ are inserted transversely through said sockets and said lower portions of the head and foot pieces to properly secure the last named in place. Also ornamental pins 6 6, each having thereon the representation of a cross and crown as one way of ornamenting the same, may be inserted through holes 7 7 in the bottom of the shallow receptacle or trough $1^b$ and driven into the ground to more securely hold or anchor the coping or covering in place if made of light material.

Having thus fully described my invention, what I claim, and desire to secure by Letters Patent, is—

1. A grave or mound coping or covering embracing two longitudinal sections each provided with inwardly-projecting lugs, means for securing said lugs together, a continuous trough extending around said sections at the base and provided with sockets at its ends, head and foot pieces at their lower ends entering said sockets and a pin for retaining said foot-pieces in said sockets.

2. A grave or mound coping or covering in two longitudinal sections or parts and having a continuous trough at its base, with sockets at its ends, and head and foot pieces with their lower ends adapted to be held in said sockets, substantially as set forth.

3. A grave or mound coping or covering having a transversely and longitudinally rounded surface, suitably or fancifully configurated, and a continuous trough at, and encompassing, its base and head and foot piece receiving sockets at its ends, and ornamental securing-pins driven through holes in the bottom of said trough, into the ground, anchoring said coping in place, substantially as set forth.

4. The grave-covering, comprising two longitudinal sections, jointly having the usual mound outline and the trough at the base, extending entirely around the same and having integral therewith head and foot piece receiving sockets, said covering-sections having integral therewith urn-sections connected together, substantially as described.

In testimony whereof I affix my signature in presence of two witnesses.

BETTIE ASHLEY BUCHANAN.

Witnesses:
WM. F. LAYNE,
FRANK NEIGHBORS.